US006780007B1

(12) United States Patent
Coffin, Sr.

(10) Patent No.: US 6,780,007 B1
(45) Date of Patent: Aug. 24, 2004

(54) ADJUSTABLE CANDLE HOLDER

(76) Inventor: Merrill J. Coffin, Sr., 2040 Alameda Padre Serra, Suite 108, Santa Barbara, CA (US) 93103

( * ) Notice: Subject to any disclaimer, the term of this patent is extended or adjusted under 35 U.S.C. 154(b) by 0 days.

(21) Appl. No.: 10/608,801

(22) Filed: Jun. 30, 2003

(51) Int. Cl.[7] .............................. F23D 3/16; A01K 97/10

(52) U.S. Cl. ......................... 431/297; 431/289; 248/535

(58) Field of Search ................................. 431/297, 289; 248/535, 539

(56) References Cited

U.S. PATENT DOCUMENTS

| | | | | | |
|---|---|---|---|---|---|
| 273,103 | A | * | 2/1883 | Kiebel | 431/297 |
| 531,028 | A | * | 12/1894 | Glaser | 431/297 |
| 773,964 | A | * | 11/1904 | McGuire | 431/289 |
| 814,636 | A | * | 3/1906 | Baumer | 431/297 |
| 1,035,711 | A | * | 8/1912 | Kampfe | 431/289 |
| 1,331,709 | A | * | 2/1920 | Ilko | 431/289 |
| 2,058,223 | A | * | 10/1936 | Isadore | 431/294 |
| 2,163,137 | A | * | 6/1939 | Emil | 431/289 |
| 2,213,203 | A | * | 9/1940 | Emil | 431/35 |
| 2,246,953 | A | * | 6/1941 | Romano | 431/289 |
| 4,663,203 | A | * | 5/1987 | Coffin, Sr. | 428/12 |
| 5,554,023 | A | * | 9/1996 | Pustay | 431/297 |

* cited by examiner

*Primary Examiner*—Alfred Basichas
(74) *Attorney, Agent, or Firm*—Albert O. Cota

(57) ABSTRACT

An adjustable candle holder (10) designed to accept candles (120) having diameters ranging from 0.188 to 0.75 inches (0.478 to 1.91 cm). The holder consists of a base (12) having attached a slider sleeve (26) that encloses a candle retaining assembly (45) that includes a candle concentric-gripping mechanism (78). When the slider sleeve (26) is in an upward, normal position, the mechanism (78) positions a set of candle gripping slats (80) in an inward configuration. Conversely, when the slider sleeve (26) is grasped and pulled downward, the slats (80) expand to allow the candle (120) to be inserted into a candle opening (52) located on the candle retaining assembly (45). After the candle (120) is inserted, the slider sleeve (26) is released which causes the candle gripping slats (80) to return to their inward configuration. In this configuration the slats (80) produce an inward force that securely holds and centers the candle (120) within the adjustable candle holder (10).

20 Claims, 6 Drawing Sheets

ADJUSTABLE CANDLE HOLDER

TECHNICAL FIELD

The invention generally pertains to adjustable candle holders and more particularly to an adjustable candle holder having a simplified self-centering mechanism that allows candles of various diameters to be securely gripped and held in a centered, perpendicular position.

BACKGROUND ART

Contemporary candle holders are typically used to function primarily as decorative pieces and secondarily to provide illumination. Most conventional candle holders have an upper circular cavity that is sized to firmly hold candles of one diameter only. Therefore, to use these candle holders with candles having a diameter that is larger or smaller than the diameter of the opening, it is necessary to modify the candle or the candle holder. In cases of larger candles the bottom section of the candle is typically reduced to the required diameter. When the candle has a smaller diameter it becomes necessary to wrap the bottom of the candle with tape, or other material, until the candle has a sufficient diameter to securely fit into the circular cavity.

Prior art has also disclosed candle holder designs where a candle holder is fitted with a self-centering mechanism that grips candles of various diameters in a perpendicular position. Most of these mechanism employ a plurality of segments or jaws that move in a uniform motion towards or away from the central axis of the candle holder when a cap, located on top or the bottom of the candle holder, is rotated. Other mechanisms use a set of springs where one end of the spring is secured to the inner wall of the candle holder and the other to a set of plates or jaws that are opened or drawn towards the center of the candle holder by the action of the springs when a handle is depressed.

The problem of having one candle holder suffice for a number of candle diameters is solved by some of prior art devices. However, these candle holders use a multiplicity of parts that have a tendency to bind by virtue of the mechanism design and/or by wax droppings that clog the mechanism. Additionally, because of the quantity and intricacy of some of the parts, a malfunction may be difficult to locate and repair.

A search of the prior art did not disclose any patents or publications that directly read on the claims of candle holder in the instant invention. However, the following U.S. patents were considered in the investigation and evaluation of the prior art.

| U.S. Pat. No. | INVENTOR | ISSUED |
|---|---|---|
| 4,663,203 | Coffin, Sr. | 5 May 1987 |
| 2,246,953 | Romano | 24 Jun. 1941 |
| 2,163,137 | Ager-wick | 20 Jun. 1939 |
| 1,331,709 | Harmata | 24 Feb. 1920 |

The U.S. Pat. No. 4,663,203 patent discloses an adjustable candle holder that allows candles of various diameters to be secured within the candle holder. The candle holder consists of a base assembly having a lower section and an upper section, and a candle holder mechanism secured within an upper section of the base. The mechanism consists of a pinion gear that operates three rack gears that include a vertical clamping segment. To operate, the lower section of the base assembly is held while the base's upper section is rotated to increase the diameter of the mechanism. A candle is then inserted and the upper section is rotated until the mechanism grips the candle.

The U.S. Pat. No. 2,246,953 patent discloses a candleholder in which candles of various diameters may be supported and held in a vertical position within the candleholder. A mechanism is employed that includes a set of springed arms, levers, jaws and operating handles. The springed arms exert pressure on the levers which tend to close the jaws. When a candle is placed in the candleholder, the handles are pressed together to open the jaws. The candle is then inserted between the jaws and the handle is released to permit the jaws to close upon and hold the candle in place.

The U.S. Pat. No. 2,163,137 patent discloses a candleholder equipped with a self-centering mechanism that grips candles of various sizes in a perpendicular position. The mechanism is comprised of three segments such as jaws having perpendicular projections for gripping the candle. By turning a cap, located on top of the candleholder, all three segments are caused to move in a uniform motion towards or away from the central axis of the candleholder.

The U.S. Pat. No. 1,331,709 patent discloses a candleholder employing a mechanism that supports candles of various diameters in a perpendicular position. The mechanism is comprised of a plurality of conically wound springs arranged in upper and lower rows and secured to the inner walls of the candle holder. The springs are attached to a plurality of plates having arcuate faces that are drawn inward towards the center by the action of the springs. Thus holding a candle inserted between the plates.

DISCLOSURE OF THE INVENTION

The adjustable candle holder allows candles of various diameters ranging from 0.188 to 0.75 inches (0.478 to 1.91 cm) to be securely gripped and automatically centered within the adjustable candle holder. The adjustable candle holder features a simplified candle concentric-gripping mechanism that solves the problems inherent with other candle holders as described in the BACKGROUND ART section.

In its basic form, the adjustable candle holder consists of:

a) A base having a lower surface, an upper surface, a lower spring-retaining cavity and a post cavity.

b) A slider sleeve having a lower edge that interfaces with the upper surface on the base, an upper end, a post sleeve, and an upper spring-retaining cavity.

c) A compression spring inserted between the lower spring-retaining cavity on the base and the upper spring-retaining cavity on the slider sleeve.

d) A candle retaining assembly consisting of:

(1) An upper section having:

(a) A lower edge, (b) An upper disk having a candle opening and dimensioned to interface with the upper edge on the slider sleeve.

(2) An attachment post that extends downward from the lower edge of the upper section and that is dimensioned to pass through the post sleeve on said slider sleeve. The post is dimensioned to be inserted into and be attached either by threads or friction to the post cavity on the base.

(3) A candle concentric-gripping mechanism that provides a means for allowing a candle to be inserted into the candle opening and subsequently gripping and centrally retaining the candle within the candle retaining assembly.

The concentric-gripping mechanism includes a set of candle gripping slats whose inward and outward positions are controlled by an inward-extending protrusion located on the slider sleeve. When the base, the slider sleeve and the candle retaining assembly are assembled, the inward-extending protrusion maintains the candle gripping slats in an inward position. When the slider sleeve is grasped and pulled downward against the bias produced by the compression spring, the set of candle gripping slats are displaced outward. This outward displacement creates an open area into which the candle can be inserted via the candle opening on the candle retaining assembly. When the downward pressure on the slider sleeve is released, the protrusion on the slider sleeve moves upward which causes the three candle gripping slats to return to their inward positions. Thus, gripping and centrally retaining the candle within the adjustable candle holder assembly.

In view of the above disclosure, the primary object of the invention is to provide an adjustable candle holder that accepts and centrally retain candles of various diameters.

In addition to the primary object of the invention it is also an object to provide an adjustable candle holder that:

is simple in construction, is reliable and relatively maintenance free, aesthetically designed, can be made in various materials and colors, and is cost effective from both a manufacturer's and a consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
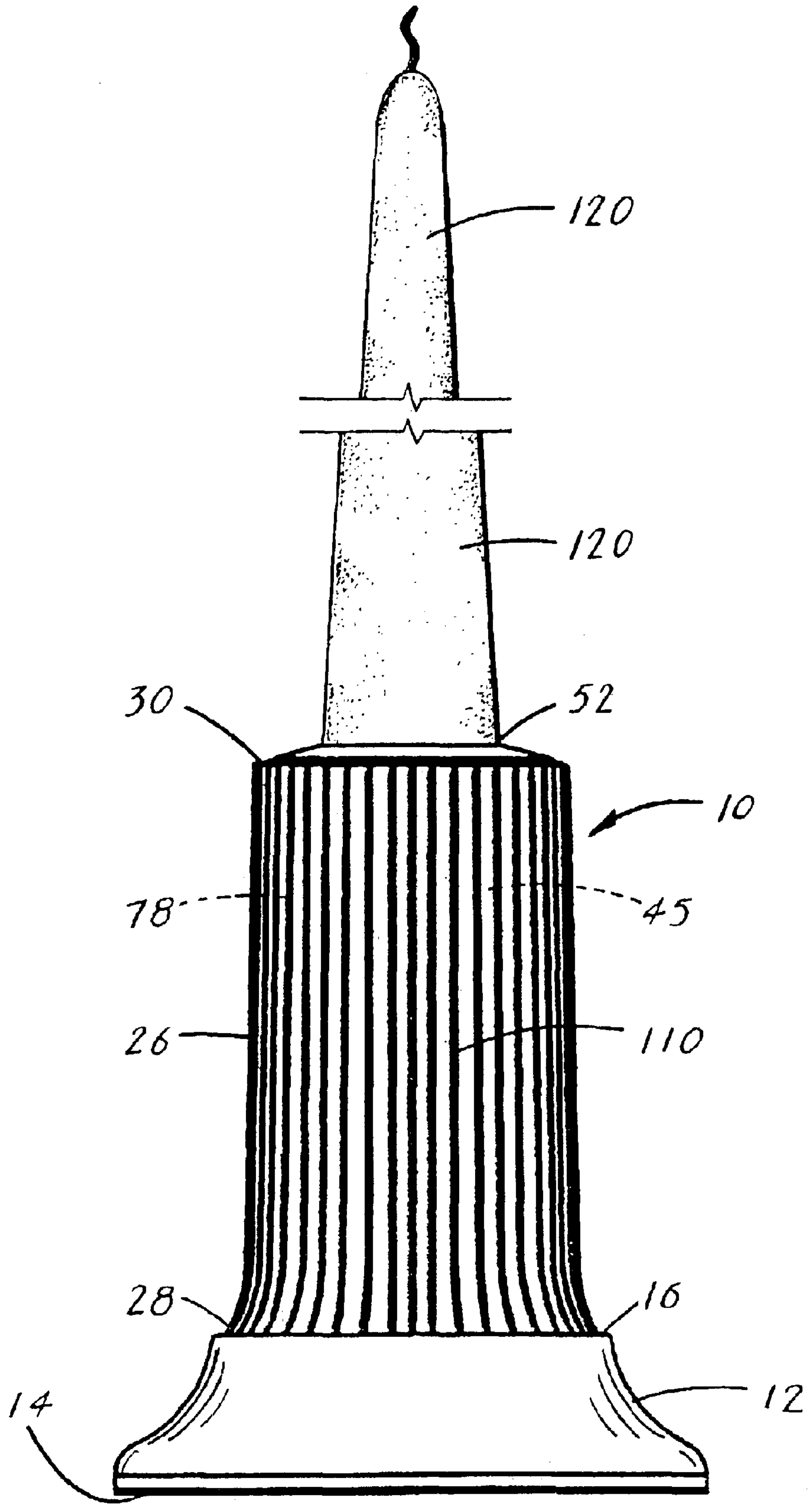
FIG. 1 is a front elevational view of an adjustable candle holder with a candle inserted into the holder.

The best mode for carrying out the invention is presented in terms of a preferred embodiment for an adjustable candle holder 10 (hereinafter "ACH 10"). The preferred embodiment of the ACH 10, as shown in FIGS. 1–8, is comprised of five major elements: a base 12, a slider sleeve 26, a compression spring 42, a candle retaining assembly 45 and a candle concentric-gripping mechanism 78. The major elements operate in combination with a candle 120.

Figure 2:
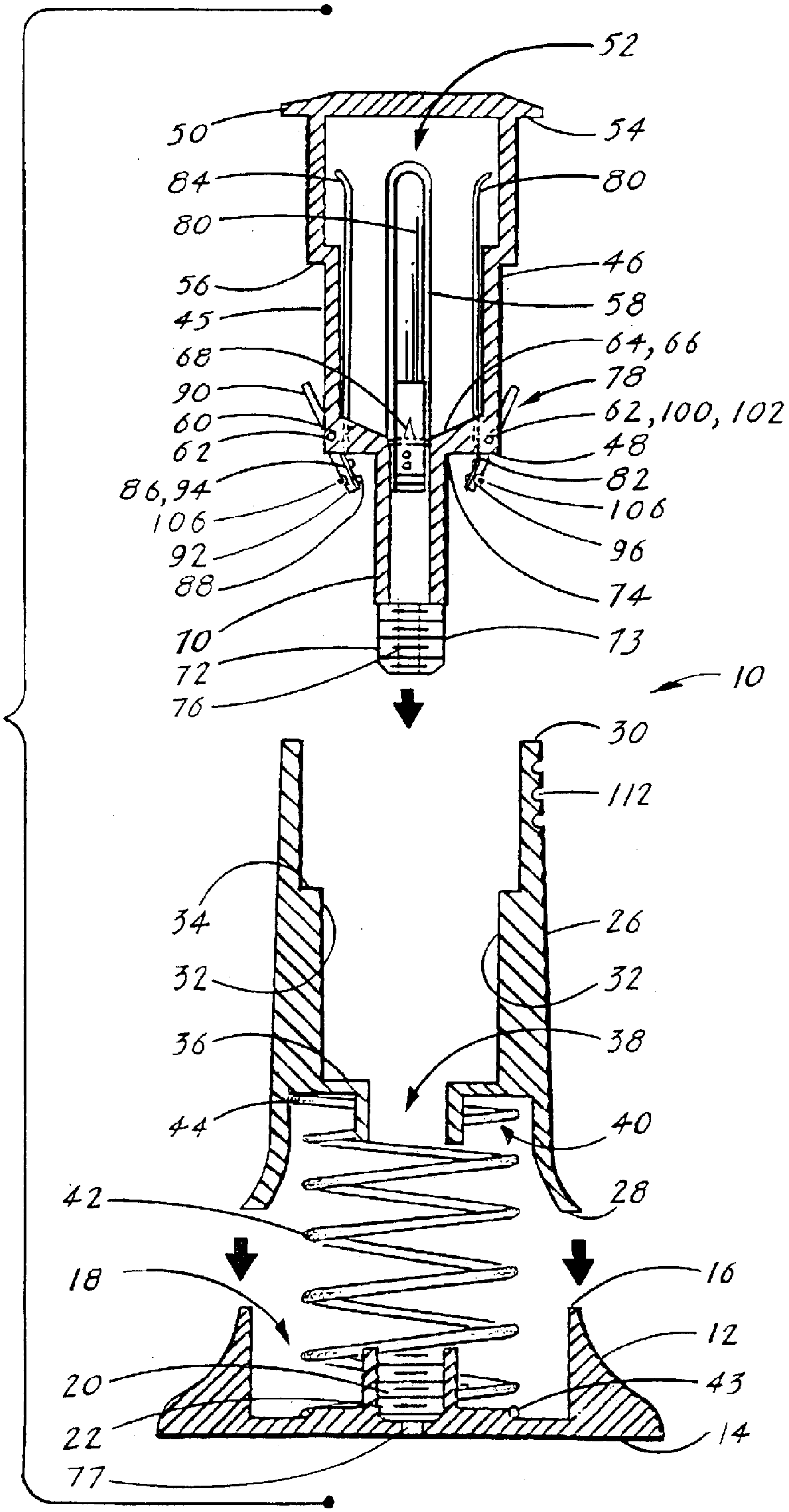
FIG. 2 is an exploded elevational view showing the relative location of a base, a slider sleeve, a compression spring and a candle retaining assembly.
Figure 3:
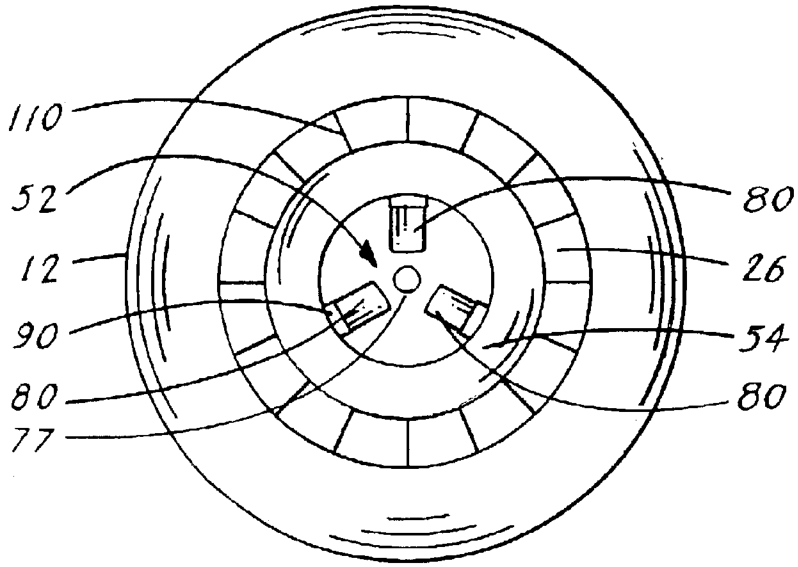
FIG. 3 is a top plan view of the adjustable candle holder shown without a candle inserted.

The base 12, as shown externally in FIGS. 1 and 3, and in cross-section in FIG. 2, is comprised of a lower surface 14 and an upper surface 16. Extending downward from the upper surface 16 is a lower spring retaining cavity 18. Extending upward from the lower surface 14 and terminating below the plane of the upper surface 16 is a post cavity 20.

The slider sleeve 26 as also shown in FIGS. 1, 2 and 3, is comprised of a lower edge 28 and an upper edge 30 wherein the lower edge 28 interfaces with the upper surface 16 and the base 12, as best shown in FIG. 2. Internally, the slider sleeve 26 includes an inward-extending protrusion 32 that forms a first upward-facing ledge 34 and a second upward-facing ledge 36. The second ledge 36 is located below the first ledge 34 and has sides that form a post sleeve 38 and an upper spring-retaining cavity 40, as shown in FIG. 2. For aesthetic reasons, the outer surface of the slider sleeve 26 can consist of a multiplicity of longitudinal serrations 110, as shown in FIG. 1, or optionally a multiplicity of radial serrations 112, as shown in FIG. 2. The compression spring 42, as shown in FIG. 2, is preferably made of steel and has a lower end 43 and an upper end 44. The lower end 43 is dimensioned to fit into the lower spring-retaining cavity 18 and over the post cavity 20 on the base 12. The upper end 44 is dimensioned to fit into the upper spring-retaining cavity 40 located on the slider sleeve 26. The function of the compression spring 42 is described infra.

The candle retaining assembly 45, as shown in FIG. 2, is comprised of an upper section 46 and an attachment post 70. The upper section is further comprised of a lower edge 48, an integral upper disk 50, a set of longitudinal gripper slots 56 and a recessed indentation 60.

The integral upper disk 50 includes a candle opening 52, as best shown in FIG. 3, and a first downward-facing lip 54 that interfaces in the assembled configuration with the upper edge 30 on the slider sleeve 26. The assembly 45 also includes a second downward-facing lip 56 that interfaces with the first upward-facing ledge 34 located on the slider sleeve 26.

Figure 4:
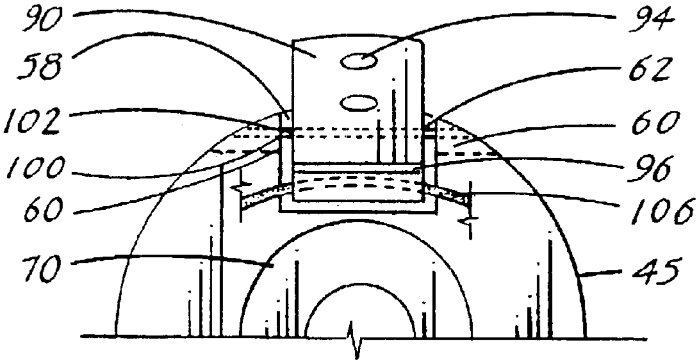
FIG. 4 is an enlarged partial top elevational view showing the attachment details of the rocker arms to the candle retaining assembly.

The set of longitudinal gripper slots 58 are spaced around the upper section 46 at 120° intervals and are located between the lower edge 48 and below the first downward-facing lip 54, as shown in FIG. 2. Adjacent the lower edge 48 and on each side of the gripper slots 58 is a recessed indentation 60, as best shown in FIG. 4. Each of the indentations 60 has a swivel pin bore 62 therethrough whose function is described infra.

Figure 5:
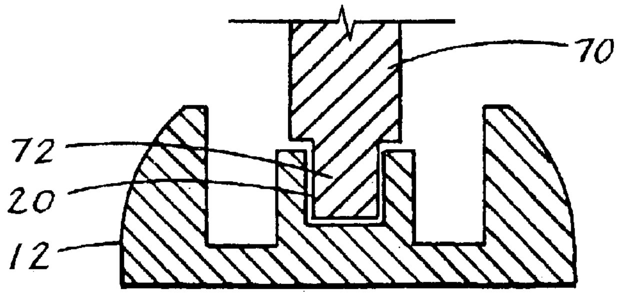
FIG. 5 is a partial cross-sectional view showing a lower section of an attachment post frictionally attached to a post cavity.

The attachment post 70 has a lower section 72 and an upper edge 74. The upper edge 74 integrally extends downward from the lower edge 48 of the upper section 46. The attachment post 70 is dimensioned to slidably pass through the post sleeve 38 located on the glider sleeve 26 and to subsequently be inserted into and attached by an attachment means to the post cavity 20 on the base 12. The post attachment means can consist, as shown in FIG. 2, of a set of external threads 73 located on the lower section 72 of the post 70 that are dimensioned to thread into a corresponding set of internal threads 22 located on the post cavity 20 located on the base 12. Optionally, as shown in FIG. 5, the lower section 72 of the post 70 can be dimensioned to frictionally fit into the post cavity 20.

When the attachment post 70 is attached, the lower edge 28 on the slider sleeve 26 interfaces with the upper surface 16 on the base 12. Also, the first downward-facing lip 54 on the candle retaining assembly 45 releasably interfaces with the upper edge 30 on the slider sleeve 26. The candle retaining assembly 45, as shown in FIG. 2, is preferably designed to include a lower edge 48 having on its lower inner surface 64 an inward slope 66 that aids in allowing the lower end of the candle 140 to fit and seat firmly. Additionally, the inward slope 66 can further include an upward-extending spike 68, as also shown in FIG. 2, that penetrates the lower surface of the candle to aid in vertically retaining the candle 120 when it is inserted into the ACH 10. In lieu of the spike 68, an upper drainage bore 76 and an aligned lower drainage bore 77 can be included in the attachment post 70 and the base 12 respectively. The bore 76 is shown in FIG. 2 and the base 77 is shown in FIGS. 2 and 3. The two aligned bores allow hot wax to drain therethrough to prevent the candle concentric-gripping mechanism 78 from clogging. Additionally, a hot wax collecting receptacle (not shown) can be attached to the lower surface 14 of the base 12.

The final major element comprising the ACH 10 is the candle concentric-gripping mechanism 78, which consists of a set of gripping slats 80, a corresponding set of rocker arms 90 and a radial spring 106, as shown in FIG. 2.

The set of candle gripping slats 80, which is comprised of three slats, are each dimensioned to traverse and be located at each of the respective gripper slots 58 located on the candle-retaining assembly 45. Each slat so has a lower section 82 having a set of rocker arm attachment bores 86, and an upper end 84 that preferably has radiused outward ends 81. The radiused ends facilitate the entry of a candle into the candle opening 52 located on the upper disk 50 of the candle retaining assembly 45.

The rocker arms 90, as shown in FIG. 2, each have a lower section 92 that includes a set of rocker arm bores 94 that are in alignment with the rocker arm attachment bores 86 on the candle gripping slats 80. The rocker arms 90 also have an outward-facing radial spring slot 96. When a bolt 88 is inserted into each of the respective bores 86,94, the candle gripping slats 80 are attached to the rocker arms 90.

Figure 8:
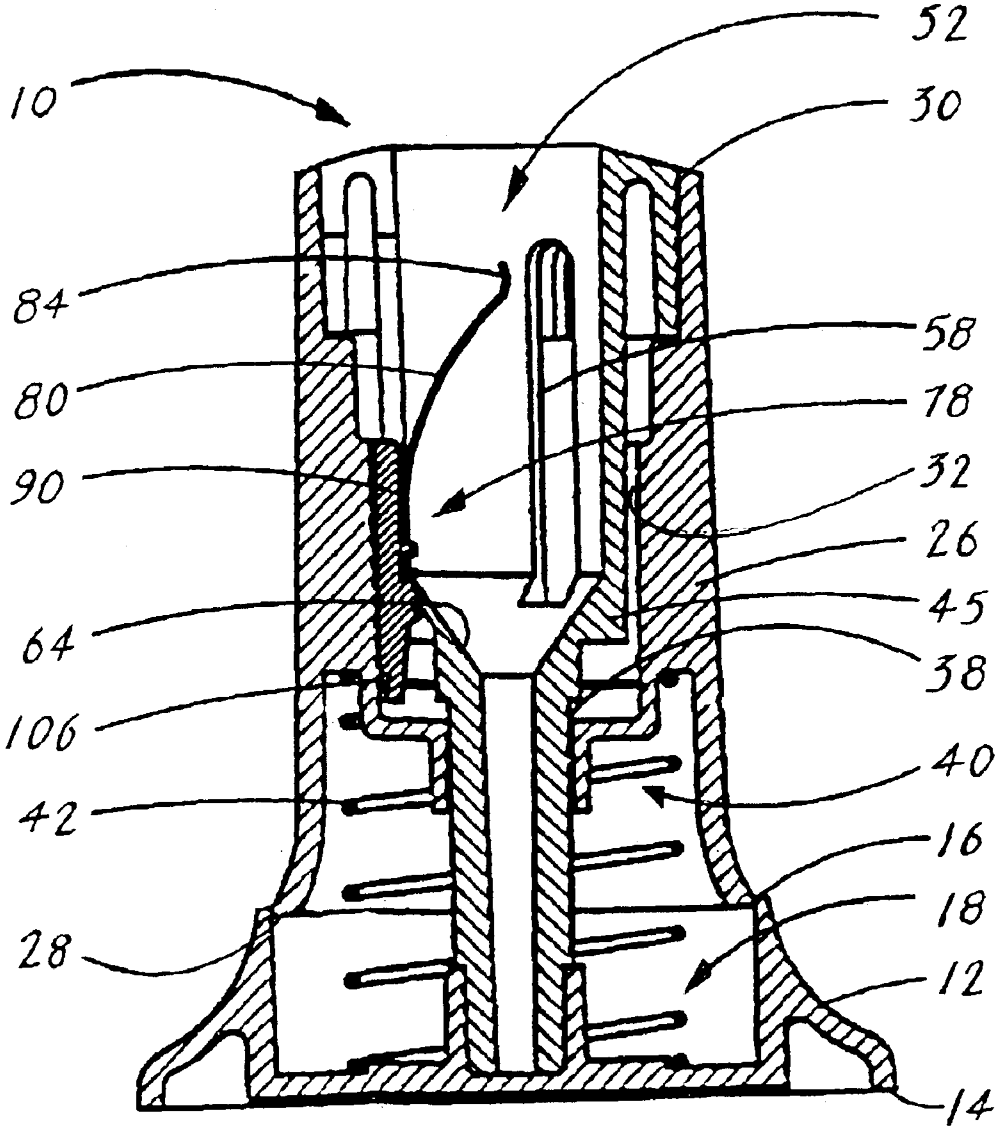
FIG. 8 is a side cross-sectional view showing an adjustable candle holder design that is more amenable to the manufacturing process.

To maintain the combination candle gripping slats 80 and the rocker arms 90, a substantially-centered swivel pin bore 100 is placed in alignment with the swivel pin bore 62 on the upper section 46 of the candle retaining assembly 45, as best shown in FIG. 4. A swivel pin 102 is then inserted into each of the respective swivel pin bores 62,100 on the rocker arms 90 and the candle retaining assembly 45. The attachment of the pin 102 allows the rocker arms 90 with the attached candle gripping slats 80 to be swivelly attached within the respective gripper slots 58. The radial spring 106, as shown in FIGS. 2, 4 and 8, is preferably made of stainless steel, spring wire, has 1.5 total coils and is dimensioned to be placed within the respective radial spring slot 96 located on each of the rocker arms 90, as shown in FIG. 2. The attached spring 106 maintains the candle gripping slats 80 biased in an outward position, as shown in FIG. 2.

Figure 6:
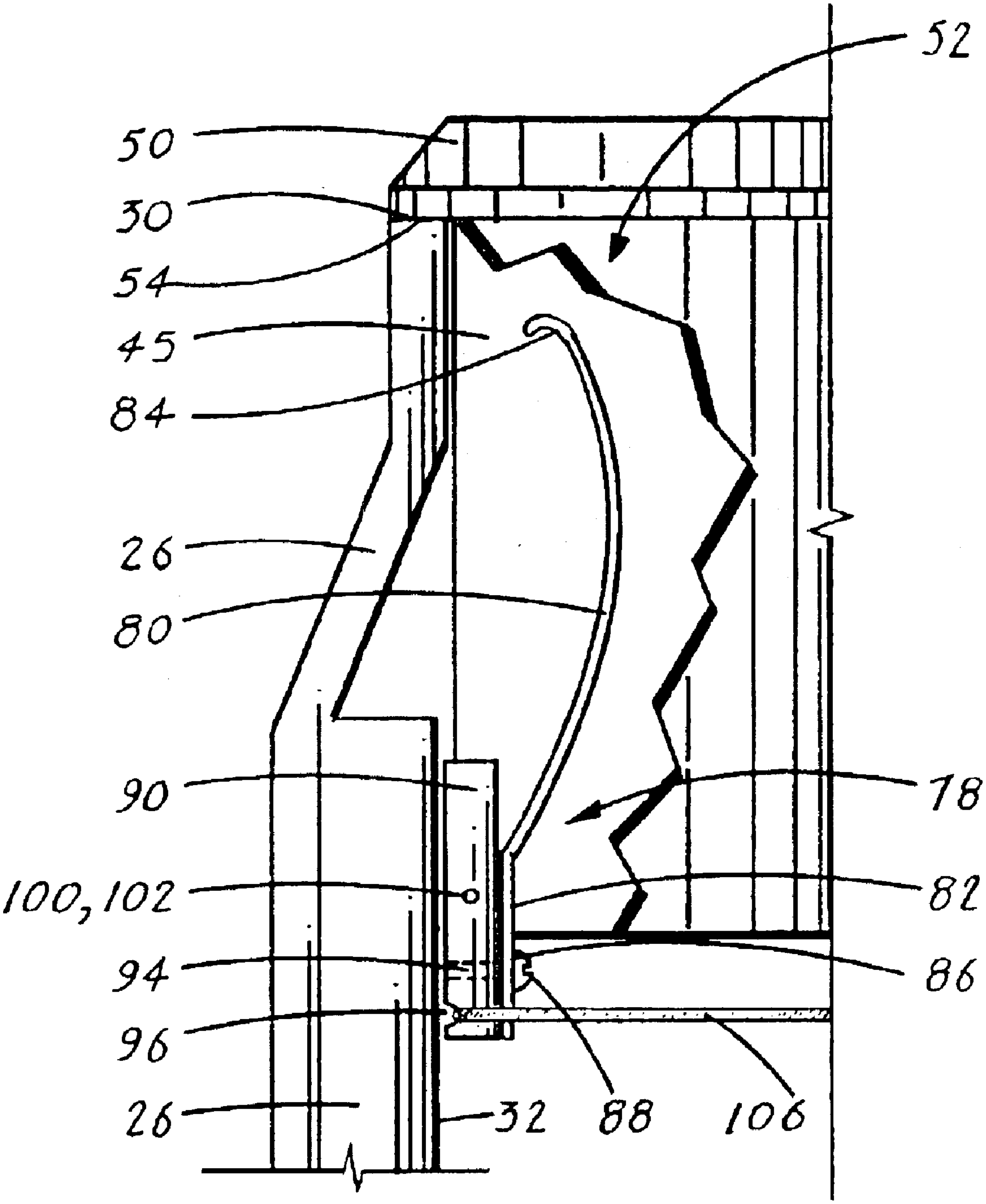
FIG. 6 is a partial front elevational view showing a slider sleeve located at its upper most position with an inward-extending protrusion that causes the rocker arms to be positioned substantially flush with the protrusion which allows an attached set of gripping slats to be placed in an inward position.

When a candle 120 is not inserted into the candle opening 52 on the candle retaining assembly 45, the compression spring 42 maintains the slider sleeve 26 in an upward position, as shown in FIG. 6. In this upright position, the upper edge 30 of the slider sleeve 26 interfaces with the upper lip 54 located on the upper disk 50 of the candle retaining assembly 44. When in the upward position, the inward-extending protrusion 36 located on the slider sleeve 26 maintains the rocker arms 90 in an inward position substantially flush with the wall of the candle retaining assembly 45, as also shown in FIG. 6. In this position, the attached candle gripping slats 80 are also positioned in an inward configuration, as also shown in FIG. 6.

Figure 7:
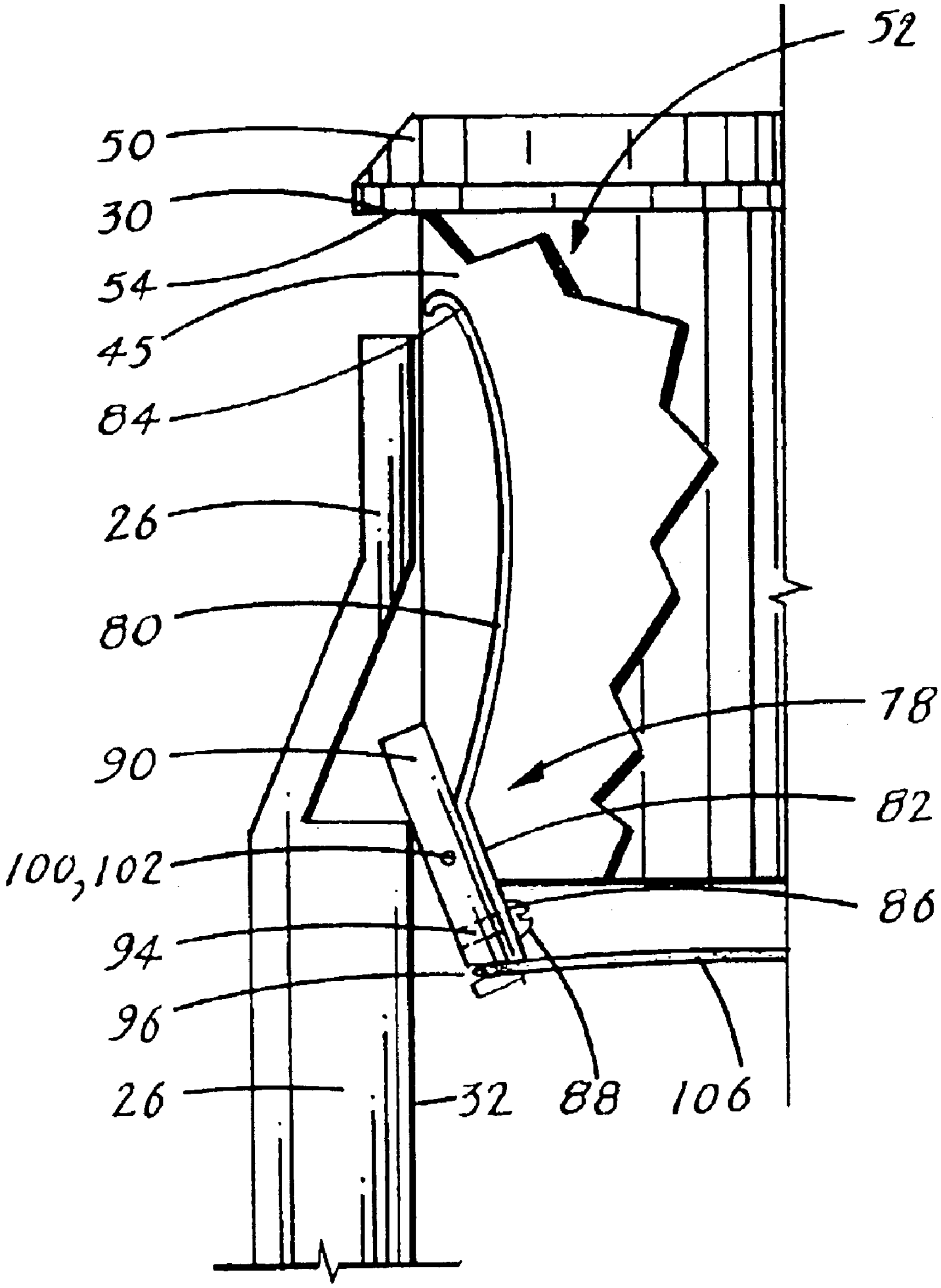
FIG. 7 is a partial front elevational view showing a slider sleeve that has been placed a downward position with an inward extending protrusion that causes the rocker arms to be positioned outward, thus placing the gripping slats in an outward position, which allows a candle to be inserted into the candle opening on the candle retaining assembly.

When the slider sleeve 26 is grasped and pulled downward against the bias of the compression spring 4, the inward-extending protrusion 32 moves downward, as shown in FIG. 7. In the downward position, the rocker arms 90 and the attached candle gripping slats 80 are positioned in an outward configuration, thereby creating an open area into which the candle 120 can be inserted. After the candle is inserted, the downward pressure on the slider sleeve 26 is released, thereby causing the rocker arms and the candle gripping slats 80 to return to their inward configuration. Thus, applying an inward grasping force to securely hold the candle within the adjustable candle holder 10, as shown in FIG. 1.

While the invention has been described in complete detail and pictorially shown in the accompanying drawings it is not to be limited to such details, since many changes and modifications may be made in the invention without departing from the spirit and scope thereof. For example, the candle gripping slats 80 can be designed to function without the need for having gripper slots 58. In FIG. 8 the ACH 10 is shown with a design that is more amenable to the manufacturing process. Hence, it is described to cover any and all modifications and forms which may come within the language and scope of the appended claims.

What is claimed is:

1. An adjustable candle holder comprising:

a) a base having a lower surface, an upper surface, a lower spring-retaining cavity and a post cavity, b) a slider sleeve having a lower edge that interfaces with the upper surface on said base, an upper end, a post sleeve, and an upper spring-retaining cavity, c) a compression spring inserted between the lower spring-retaining cavity on said base and the upper spring-retaining cavity on said slider sleeve, d) a candle retaining assembly comprising:

(1) an upper section having:

(a) a lower edge, (b) an upper disk having a candle opening and dimensioned to interface with the upper edge on said slider sleeve, (2) an attachment post that extends downward from the lower edge of the upper section and that is dimensioned to pass through the post sleeve on said slider sleeve and to be inserted into and be attached by an attachment means to the post cavity on said base, and (3) means for allowing a candle to be inserted into the candle opening and subsequently gripping and centrally retaining the candle within said candle retaining assembly.

2. The adjustable candle holder as specified in claim 1, wherein said slider sleeve further comprises an inward-extending protrusion.

3. The adjustable candle holder as specified in claim 2, wherein the upper section of said candle retaining assembly further comprises:

a) a set of gripper slots that extend longitudinally from the lower edge to the upper disk, and b) a recessed indentation located adjacent the lower edge and on each side of the gripper slots, wherein each indentation having a swivel pin bore therethrough.

4. The adjustable candle holder as specified in claim 3, wherein said means for attaching the attachment post to the post cavity on said base comprises:

a) the attachment post having a lower section that includes a set of external threads, and b) the post cavity on said, base having a corresponding set of internal threads.

5. The adjustable candle holder as specified in claim 3, wherein said means for attaching the attachment post to the post cavity on said base comprises the attachment post having a lower section that is dimensioned to fictionally fit into the post cavity on said base.

6. The adjustable candle holder as specified in claim 3, wherein said candle retaining assembly is further comprised of a candle concentric-gripping mechanism that provides the means for allowing the candle to be inserted and centrally retained within said candle retaining assembly, said mechanism comprising:

a) a set of candle gripping slats dimensioned to traverse and be located at each of the gripper slots on said candle-retaining assembly, wherein each of the candle gripping slats having a lower section and an upper end, with the lower section having a set of rocker arm attachment bores, b) a set of rocker arms each having:

(1) a lower section that includes a set of rocker arm bores in alignment with the rocker arm attachment bores on the candle gripping slats, and an outward-facing radial spring slot, wherein a bolt is inserted into each of the respective bores to attach the candle gripping slats to the rocker arms, (2) a substantially-centered swivel pin bore that is in alignment with the swivel pin bore on the upper section of said candle retaining assembly, (3) a swivel pin that, when inserted into each of the respective swivel pin bores on the rocker arms and said candle retaining assembly, allows the rocker arms with the attached candle gripping slats to be swivelly attached within the respective gripper slots, (4) a radial spring dimensioned to be placed within the respective radial spring slots on each of the rocker arms, wherein said radial spring maintains the candle gripping slats biased in an outward position, wherein when said base, said slider sleeve and said candle retaining assembly are assembled, the inward-extending protrusion on said slider sleeve maintains the rocker arms in an inward position, with the attached candle gripping slats also positioned in an inward configuration, wherein when said slider sleeve is grasped and pulled downward, the inward-extending protrusion moves downward, thus releasing and allowing the rocker arms to extend outward, which causes the candle gripping slats to be positioned in an outward configuration that creates an open area into which the candle can be inserted via the candle opening, wherein after the candle is inserted, the downward pressure on said slider sleeve is released, thereby causing the rocker arms and the candle gripping slats to return to their inward configuration, which applies an inward gripping force that securely holds and centers the candle within said adjustable candle holder.

7. The adjustable candle holder as specified in claim 1, wherein said means for attaching the lower section of said attachment post to the post cavity on said base is accomplished by dimensioning the lower section to frictionally fit into the post cavity.

8. The adjustable candle holder as specified in claim 1, wherein the lower edge of said candle retaining assembly further comprises on its lower inner surface an inward slope that aids in allowing the lower end of the candle to seat firmly.

9. An adjustable candle holder comprising:

a) a base having:

(1) a lower surface, (2) an upper surface, (3) a lower spring-retaining cavity that extends downward from the upper surface, (4) a post cavity that extends upward from the lower surface and terminates below the plane of the upper surface, b) a slider sleeve having:

(1) a lower edge that interfaces with the upper surface on said base, (2) an upper edge, (3) an inward-extending protrusion that forms a first upward-facing ledge, a second upward-facing ledge having sides that form a post sleeve, and an upper spring-retaining cavity, c) a compression spring having a lower end that fits into the lower spring-retaining cavity and over the post cavity on said base, and an upper end that fits into the upper spring-retaining cavity on said slider sleeve, d) a candle-retaining assembly having:

(1) an upper section having:

(a) a lower edge, (b) an integral upper disk having a candle opening and a first downward-facing lip that interfaces with the upper edge on said slider sleeve, and a second downward-facing lip that interfaces with the first upward-facing ledge on said slider sleeve, (c) a set of longitudinal gripper slots spaced around the upper section at 120° intervals and located between the lower edge and the first downward-facing lip, (d) a recessed indentation located adjacent the lower edge and on each side of the gripper slots, wherein each indentation having a swivel pin bore therethrough, (2) an attachment post having:

(a) a lower section, (b) an upper edge that integrally extends downward from the lower edge of said upper section, wherein said attachment post is dimensioned to slidably pass through the post sleeve on said slider sleeve and to be inserted into and attached by an attachment means to the post cavity on said base, wherein when said attachment post is attached, the lower edge on said slider sleeve interfaces with the upper surface on said base, and the first downward-facing lip on said candle retaining assembly releasably interfaces with the upper edge on said slider sleeve, e) a candle concentric-gripping mechanism comprising:

(1) a set of candle gripping slats dimensioned to traverse and be located at each of the gripper slots on said candle-retaining assembly, wherein each of the candle gripping slats having a lower section and an upper end, with the lower section having a set of rocker arm attachment bores, (2) a set of rocker arms each having:

(a) a lower section that includes a set of rocker arm bores in alignment with the rocker arm attachment bores on the candle gripping slats, and an outward-facing radial spring slot, wherein a bolt is inserted into each of the respective bores to attach the candle gripping slats to the rocker arms, (b) a substantially-centered swivel pin bore that is in alignment with the swivel pin bore on the upper section of said candle retaining assembly, (c) a swivel pin that, when inserted into each of the respective swivel pin bores on the rocker arms and said candle retaining assembly, allows the rocker arms with the attached candle gripping slats to be swivelly attached within the respective gripper slots;

(d) a radial spring dimensioned to be placed within the respective radial spring slots on each of the rocker arms, wherein said radial spring maintains the candle gripping slats biased in an outward position, wherein when said base, said slider sleeve and said candle retaining assembly are assembled, the inward-extending protrusion on said slider sleeve maintains the rocker arms in an inward position, with the attached candle gripping slats also positioned in an inward configuration, wherein when said slider sleeve is grasped and pulled downward, the inward-extending protrusion moves downward, thus releasing and allowing the rocker arms to extend outward, which causes the candle gripping slats to be positioned in an outward configuration that creates an open area into which the candle can be inserted via the candle opening, wherein after the candle is inserted, the downward pressure on said slider sleeve is released, thereby causing the rocker arms and the candle gripping slats to return to their inward configuration, which applies an inward gripping force that securely holds and centers the candle within said adjustable candle holder.

10. The adjustable candle holder as specified in claim 9, wherein said base, said slider assembly and said candle retaining assembly are molded of metal.

11. The adjustable candle holder as specified in claim 9 wherein said attachment post and said base further having a substantially centered upper and lower drainage bore that allows hot candle wax to drain therethrough.

12. The adjustable candle holder as specified in claim 9, wherein said base, said slider assembly and said candle retaining assembly are molded of plastic having a silver or gold plating.

13. The adjustable candle holder as specified in claim 9, wherein said means for attaching the lower section of said attachment post to the post cavity of said base comprises:

a) the lower section of said post further comprising a set of external threads, and b) the post cavity having a corresponding set of internal threads.

14. The adjustable candle holder as specified in claim 9, wherein said means for attaching the lower section of said attachment post to the post cavity on said base is accomplished by dimensioning the lower section to frictionally fit into the post cavity.

15. The adjustable candle holder as specified in claim 9, wherein said slider sleeve further comprises a multiplicity of longitudinal serrations.

16. The adjustable candle holder as specified in claim 9, wherein said slider sleeve further comprises a multiplicity of radial serrations.

17. The adjustable candle holder as specified in claim 9, wherein the lower edge of said candle retaining assembly further comprises on its lower inner surface an inward slope that aids in allowing the lower end of the candle to fit and seat firmly.

18. The adjustable candle holder as specified in claim 17, wherein the inward slope further comprises an upward extending spike that penetrates the lower surface of the candle to further aid in vertically retaining the candle inserted into said adjustable candle holder.

19. The adjustable candle holder as specified in claim 17, wherein the upper end of said candle gripping slats have radiused outward ends that facilitate the entry of the candle into the candle opening on the upper disk of said candle gripping assembly.

20. The adjustable candle holder as specified in claim 1, wherein said holder is designed to accept candles having a diameter ranging from 0.188 to 0.75 inches (0.478 to 1.91 cm).

* * * * *